United States Patent [19]

Chant

[11] 4,132,423

[45] Jan. 2, 1979

[54] ATTACHMENTS ENABLING VEHICLES TO NEGOTIATE OBSTACLES

[75] Inventor: John B. Chant, Alton, England

[73] Assignee: Vessa Limited, Hampshire, England

[21] Appl. No.: 857,640

[22] Filed: Dec. 5, 1977

[30] Foreign Application Priority Data

Dec. 9, 1976 [GB] United Kingdom ............... 51420/76

[51] Int. Cl.² ............................................... B62B 5/02

[52] U.S. Cl. ............................... 280/5.3; 280/DIG. 10

[58] Field of Search ...................... 280/5.2, 5.28, 5.32, 280/5.24, 5.26, 5.3, 289 WC, DIG. 10; 180/8 R, 8 A, 8 B, 8 BA, DIG. 3; 297/DIG. 4

[56] References Cited

U.S. PATENT DOCUMENTS

| | | | |
|---|---|---|---|
| 998,771 | 7/1911 | Herman | 280/5.2 |
| 2,427,482 | 9/1947 | Weissman | 280/5.2 |

FOREIGN PATENT DOCUMENTS

| | | | |
|---|---|---|---|
| 901736 | 7/1949 | Fed. Rep. of Germany | 280/5.32 |
| 1755951 | 11/1971 | Fed. Rep. of Germany | 280/5.2 |

*Primary Examiner*—Joseph F. Peters, Jr.
*Assistant Examiner*—R. Schrecengost
*Attorney, Agent, or Firm*—Pollock, Vande Sande and Priddy

[57] ABSTRACT

Attachments are described for enabling small front wheels of wheelchairs to negotiate side-walk curbs or the like. An arcuate rocker end for engaging the curb is fixed to a strut pivoted above the wheel and held in a ready position, determined by engaging abutments, by a prestressed, i.e. strained, spring which is further strained when the rocker end engages a curb and the advancing wheelchair causes the strut to swing backwards lifting the wheel onto the side-walk, whereupon, the rocker end is free to return to the ready position. The rocker end may be manually shifted to an idle position in which it is firmly held by the spring. In one example, one of the abutment members, which is normally fixed, is withdrawn to enable the strut to be forced behind it, the member then being released to retain the rocker end in the idle position. In another example, a mechanism is interposed between the strut and spring such that the spring can be further stressed as the mechanism passes over a dead-center position carrying the rocker end from the ready to the idle position or vice versa in each of which positions it is held by the stressed spring. In a third example the strut and spring form parts of a sub-assembly that can be rotated from the ready to the idle position of the rocker and latched in each position.

10 Claims, 10 Drawing Figures

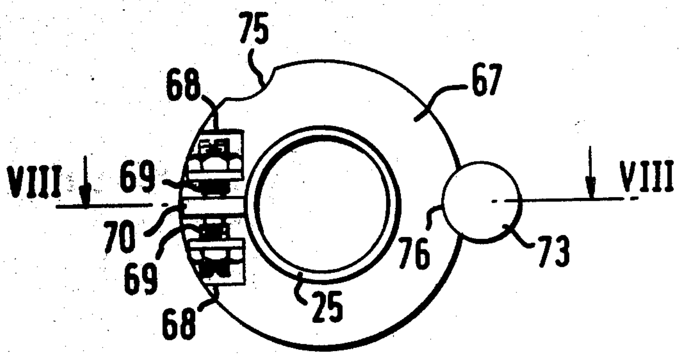
FIG.9
FIG.10
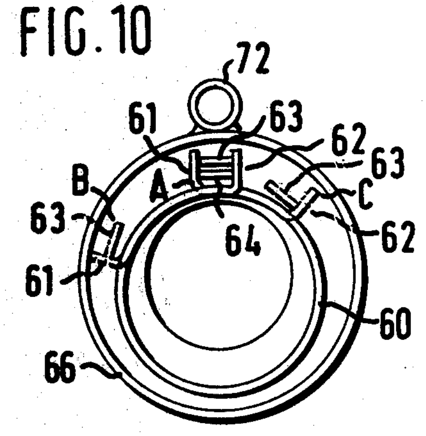

ATTACHMENTS ENABLING VEHICLES TO NEGOTIATE OBSTACLES

FIELD OF THE INVENTION

This invention relates to attachments for enabling relatively small diameter vehicle wheels to negotiate obstructions that lie in the path of the wheels. The vehicles with which the invention is primarily concerned are wheelchairs and the obstructions that the attachments are primarily designed to negotiate are curbs at the edges of side-walks or pavements. However, it will be readily apparent that the invention can be applied to other forms of vehicle and used to traverse other forms of obstructions.

DESCRIPTION OF THE PRIOR ART

Devices are known in which lever means or a strut pivoted to the vehicle frame adjacent each wheel to be assisted over an obstruction are arranged to engage the obstruction of raise the vehicle at the wheel zone to a position in which the wheel can negotiate and pass over the obstruction.

SUMMARY OF THE INVENTION

It is one object of the present invention to provide improvements in such devices that render them particularly suitable for wheelchairs by providing precise control of the position of the strut both in regard to its initial position in which it is located to negotiate a curb, or other obstruction, when encountered, and in regard to its easy transfer to an idle position.

According to the invention, an attachment for a vehicle having at least one relatively small wheel comprises a strut, arranged to be pivoted to the vehicle about a horizontal axis higher than the wheel, and a prestressed spring connected so as to hold the strut set in a ready position, determined by abutting members, such that when the free end of the strut encounters a curb, or other obstruction, it rocks on the obstruction, separating the abutting members, increasing the stress in the spring and lifting the vehicle in the wheel zone until the wheel passes onto the obstruction and the strut then reaching a position relatively to the wheel such that the spring can return the strut to the ready position.

Very advantageously, means are provided for holding the strut in an idle or inoperative position. This may be effected by latching the strut in an ineffective position, or by providing mechanism whereby the spring is effective for holding the strut in an idle position or, as another alternative by providing a sub-assembly comprising the strut and spring, arranged to be turned as a unit to a position in which the strut is in an idle position.

The attachment may be constructed as a removable addition to the vehicle or it may be fixed permanently thereto. When as is usually the case there are two side-by-side wheels to be assisted, an attachment is provided for each wheel.

The vehicle may be either motor driven or manually propelled or pushed. However, the invention is particularly beneficial when applied to a wheelchair having two power wheels differentially driven to provide for steering and two comparatively small freely rotating front castor wheels.

DESCRIPTION OF THE DRAWINGS

In order that the invention may be clearly understood and readily carried into effect. Curb-climbing attachments for a wheelchair will now be described, by way of example with reference to the accompanying drawings, in which:

FIGS. 9 and 10 are cross-sections through the mechanism of FIG. 8.

Figure 4:
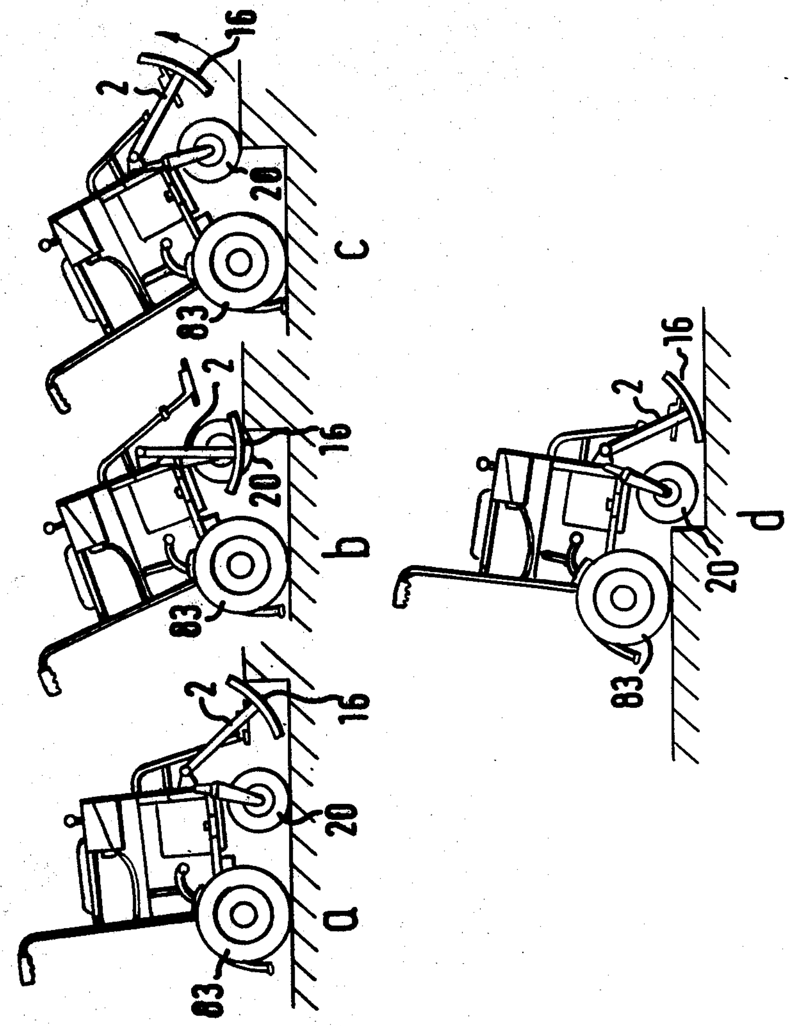
FIG. 4 shows a wheelchair furnished with a curb-climbing attachment, shown very diagrammatically, the chair and attachment being shown in four different operative conditions a, b, c and d.

This particular example of the invention is designed for use with a wheelchair having power driven rear wheels provided with independent motor drives which are differentially controlled for steering. Two freely rotating castor wheels 20 (FIG. 4) are provided at the front of the chair and a mechanism as shown in FIG. 1 is mounted on each side of the chair outside the castor wheel.

Figure 1:
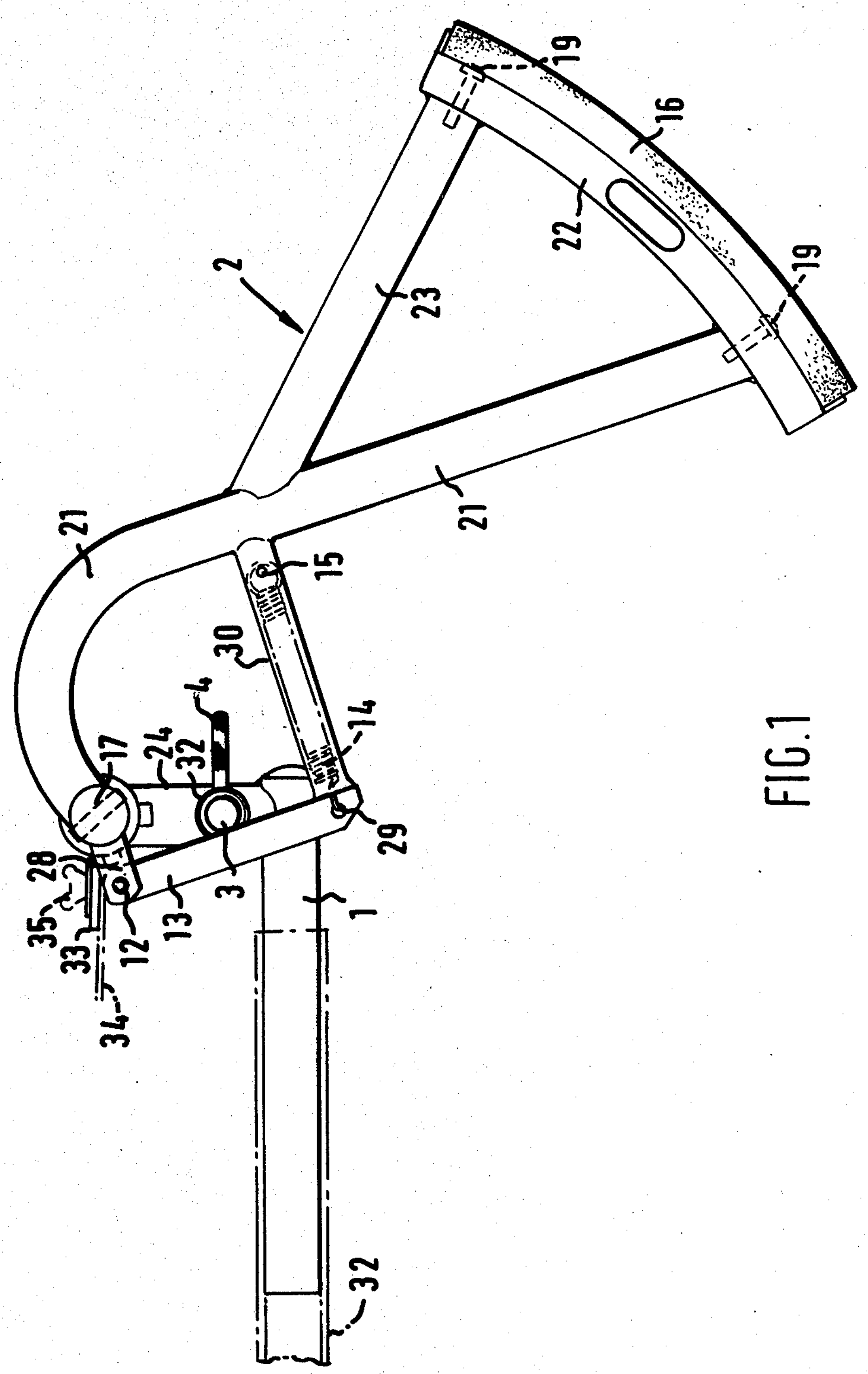
FIG. 1 is a side elevation of one curb-climbing attachment.

The mechanism of the attachment shown in FIG. 1 comprises a strut assembly 2 having a main strut 21 to which is welded an arcuate rocker end 22 braced by a strut 23. A rubber tyre 16 is fixed along the underside of the rocker end 22 in an arcuate cavity therein by screws 19.

The main strut 21 has an arcuate upper end which is pivoted about a horizontal axis to a vertical arm 24 welded to a bracket 1 that is arranged to be a sliding fit in a tube 32 on the wheelchair. A horizontal sleeve 25 (FIG. 2) is fixed to the top of the arm 24 and a tube 26 coaxial with the sleeve 25 is rotatably mounted therein with intervening oilite bearings 8, the tube 26 being fixed to a tubular element 27 welded to the end of the main strut 21. The opposed ends of the sleeve 25 and tubular element 27 are closed by plugs 11, 17.

A torsion spring 6 is secured between a dowel 9 fixed to the element 27 and a dowel 10 fixed to the sleeve 25. This spring is prestressed so that it would cause the strut assembly 2 to swing round in a counter clockwise direction, as viewed in FIG. 1, if it was not held by an abutment in the form of a locking plunger 3 in the position of FIG. 1, ready for curb-climbing action. The axis of the spring is substantially above the castor wheels.

The plunger 3 is engaged by a link 13 pivoted at 12 between ears 28 welded to the tubular element 27 and connected at the opposite end by a member 29 to the near end of a tension spring 14 in a tube 30 welded to the main strut 21. The spring 14 is anchored at its inner end by a dowel 15 in the tube 30. Normally the spring 14 holds the link 13 in contact with the end of the tube 30 so that the strut assembly 2, link 13 and tube 30 can swing as a unit about the axis of the torsion spring 6 in a clockwise direction away from the locking plunnger 3 when the rocker end encounters a curb. However, if an abnormal force in the opposite direction acts on the strut assembly 2, as when the wheelchair is descending a curb backwards, the spring 14 yields while the link 13 remains in contact with the locking plunger 3 and no damage is done.

In operation, the attachment is secured onto one side of a wheelchair by sliding the bracket 1 into the tube 32 and fixing a bifurcated tongue 33, welded to the sleeve 25, to a member 34 on the wheelchair by means of a bolt and wing nut 35. When the arcuate tire 16 engages the top edge of a curb (FIG. 4*a*) while the wheelchair is being driven forward, the strut assembly swings counter-clockwise about the instantaneous centre of rotation at the point of contact and also counter-clockwise about the axis of the torsion spring 6 so that while the stress in the spring 6 is increased, the front of the wheelchair is lifted while moving forward (FIG. 4*b*). The similar attachment on the other side of the chair, of course, acts simultaneously in the same way. At the end of this movement the castor wheels roll over the top edge of the curb freeing the tyres 16 from the curb (FIG. 4*c*) to return to the position of FIG. 1 relatively to the brackets 1.

The arcuate formation of the rocker end 22 provides for a considerable variation in the height of curb, or like obstruction, that the mechanism can negotiate. The centre of the arcuate curve of the rocker end is on the axis of the torsion spring 6 so that the strut assembly rolls like a wheel over the curb. The motor driven rear wheels 83 are of considerably greater diameter and so can negotiate the curb without assistance.

In descending a curb (FIG. 4*d*), the rocker end strikes the ground first breaking the fall and then rolls until the castor wheels contact the ground and lift the strut assembly clear.

The locking plunger 3, is mounted to reciprocate in a tube 32 welded to the arm 24, and can withdraw manually from the plane of the link 13 against the action of a spring 5 (FIG. 3) by a knurled pin 4, fixed to the plunger 3, which cap travel along a slot 35 in the tube 32. To render the lever 21 and tire 16 inactive, the lever 21 is manually swung clockwise and the plunger 3 withdrawn for the lever 21 to travel to the left-hand side of plunger 3 (as viewed in FIG. 1), the stress in the torsion spring 6 being correspondingly increased. The plunger 3 is then released so as to bear on the lever 21 and hold it in the idle position. To permit this movement to take place the end of the plunger may be bevelled so that the lever 21 can snap past the plunger. To cause the tire 16 to return to the position of FIG. 1 under the action of the torsion spring 6, the plunger is withdrawn by the pin 4.

Figure 3:
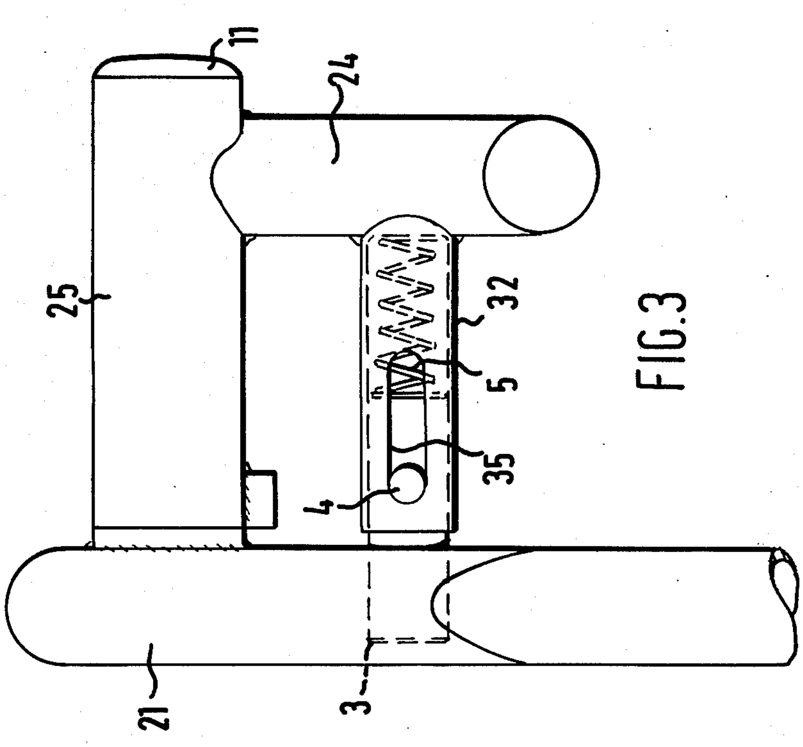
FIG. 3 is a rear elevation of another portion of the attachment of FIG. 1.
Figure 2:
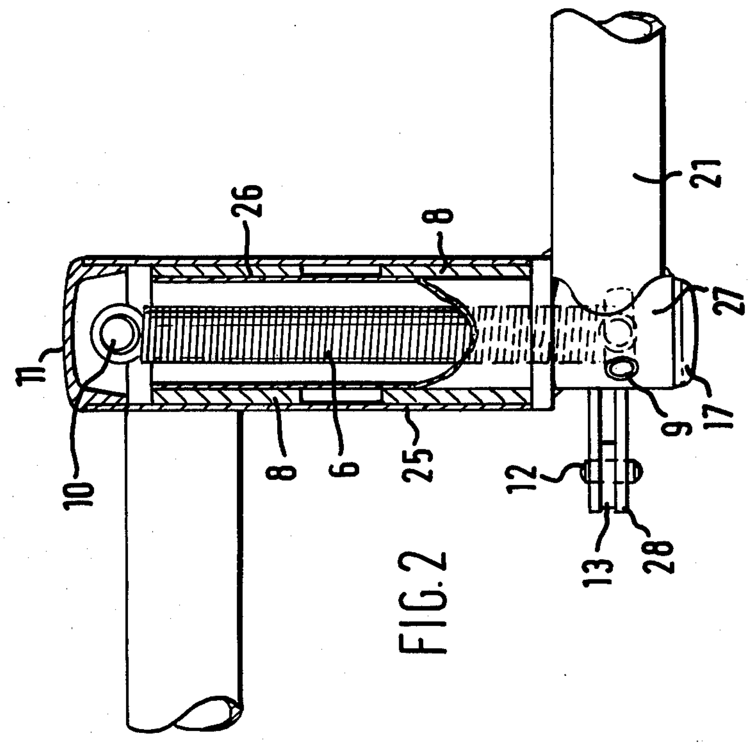
FIG. 2 is a sectional plan of a portion of the attachment of FIG. 1.
Figure 5:
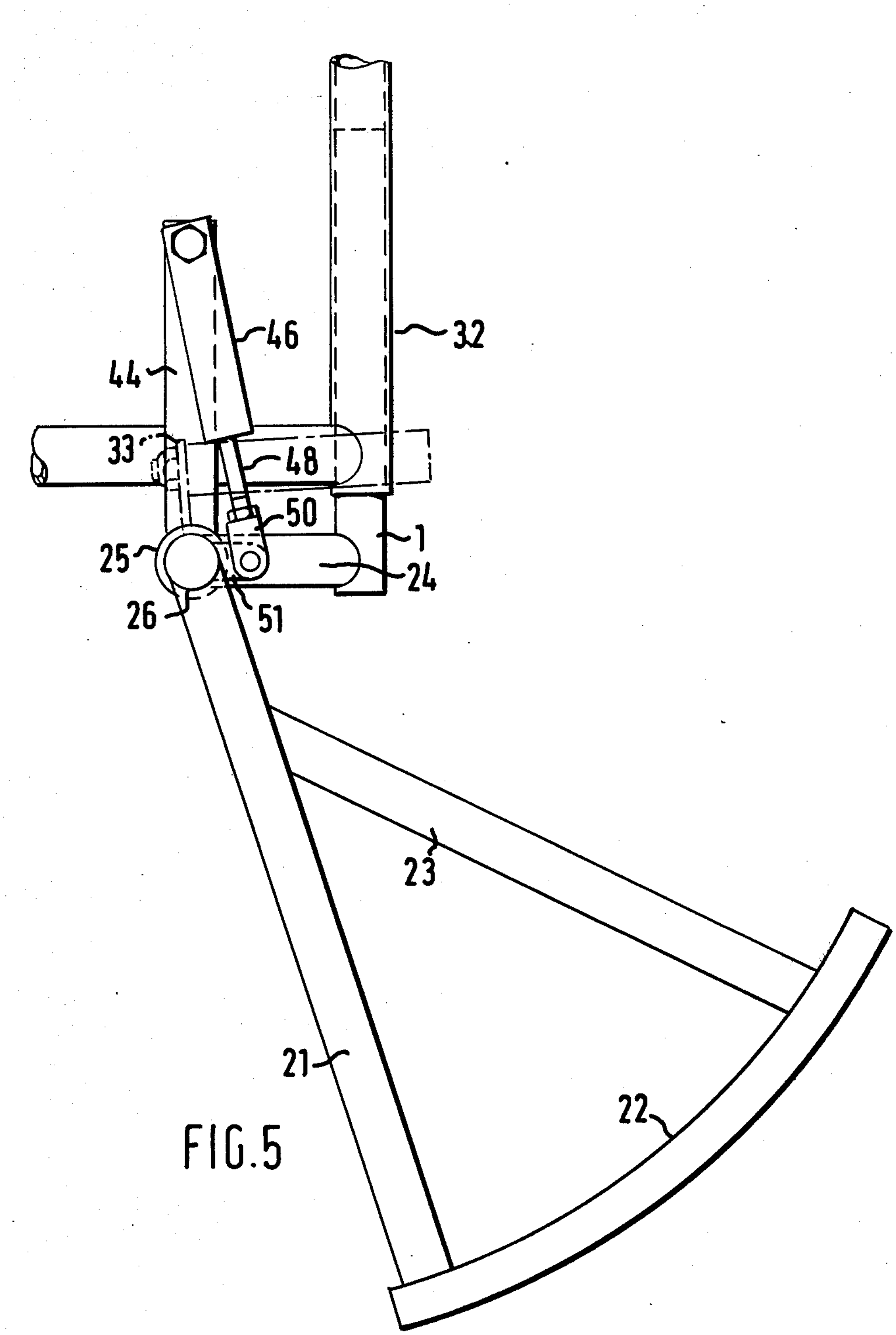
FIG. 5 is a side elevation of a second curb-climbing attachment.
Figure 6:
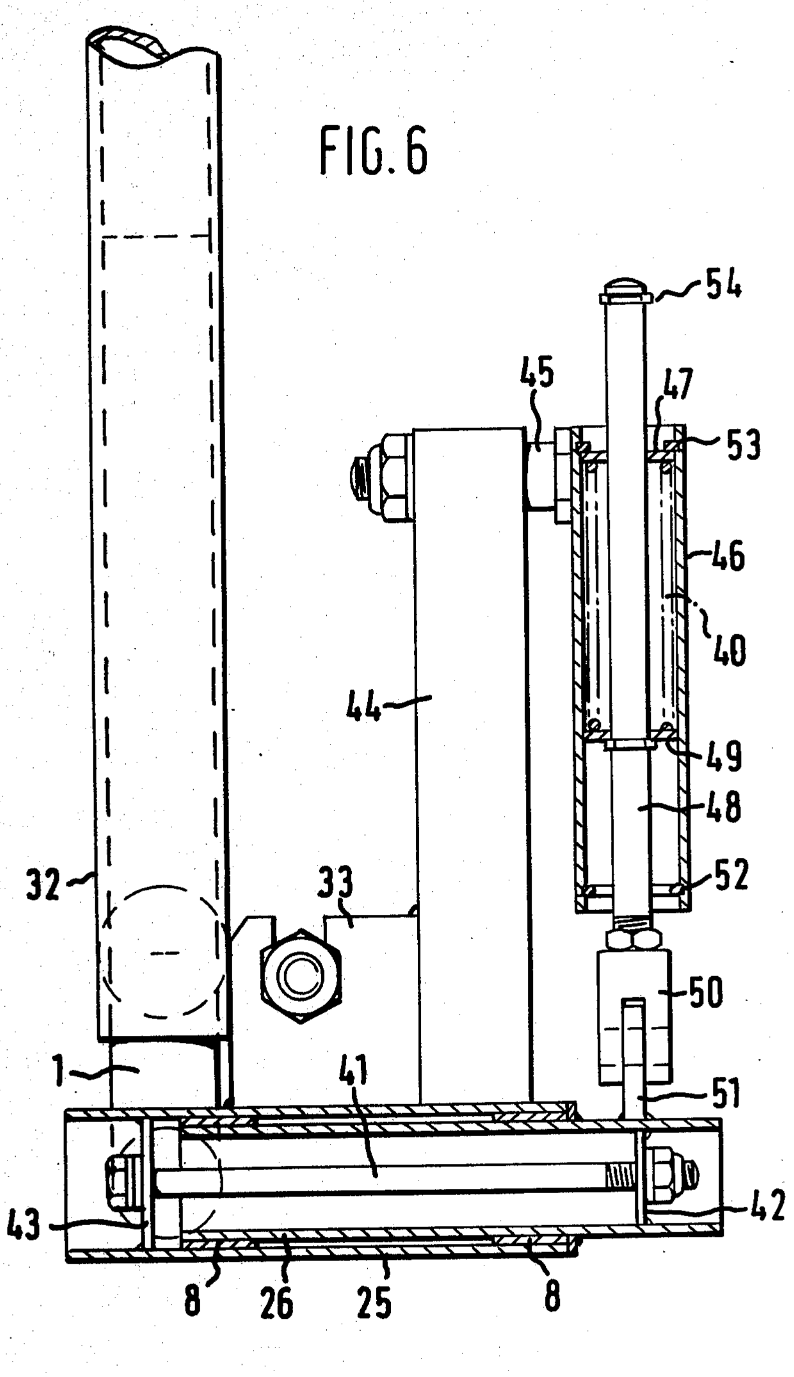
FIG. 6 is a sectional plan of a portion of the curb-climbing attachment of FIG. 5.
Figure 7:
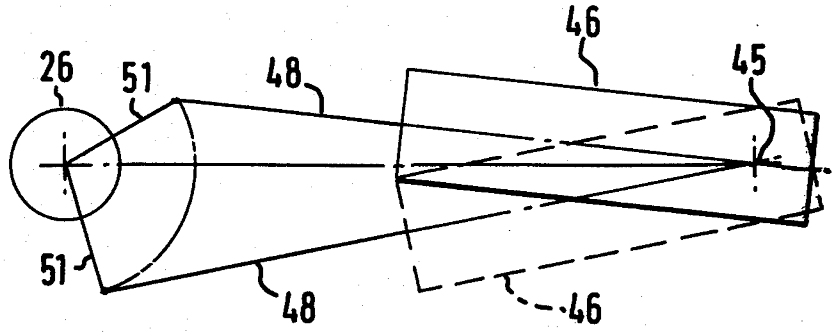
FIG. 7 is a diagram indicating the mode of action of spring mechanism in the construction of FIGS. 5 and 6.

Referring now to FIGS. 5 to 7 wherein similar reference numerals are used, where possible, to those used for equivalent parts in the construction of FIGS. 1 to 3, it will be seen that the main strut 21 is again welded to a tube 26 pivotable about its axis in a sleeve 25, but in this case the torsion spring is replaced by an external compression spring 40 (described below) and an axial tie rod 41 is mounted in the tube 26 and anchored to plates 42, 43 respectively fixed across the tube 26 and sleeve 25 to prevent axial movement of the tube 26.

A pillar 44 is fixed to the sleeve 25 and is provided at its upper end with a pivotable support 45 for an oscillatable cylinder 46 in which the spring 40 is located. In the condition shown in FIG. 6, the upper end of the cylinder is closed by a disc 47 bearing on a circlip 53 and through which an axial rod 48 is guided. The compression spring 40 is compressed between this disc 47 and a disc 49 held axially fixed on the rod 48. Beyond the cylinder 46, the rod 48 has fixed thereto a fork 50 pivoted to a radial crank arm 51 fixed to the sleeve 25.

As shown in FIG. 7, the cylinder 46 can oscillate between the full line positin and the broken line position, passing through a dead-centre position shown in FIG. 6 wherein the crank arm 51 is in alignment with the rod 48. Clearly, in the dead-centre position the spring 40 is in its most compressed condition and the mechanism can be caused to snap over to either one of the extreme positions of FIG. 7. In the extreme position shown in FIG. 5, the spring is holding the main strut 21 and rocker end 22 in the ready position. In this condition the spring, now slightly relaxed but still under some compressive stress, is holding the disc 49 in contact with a circlip 52 at the low end of the cylinder 46. Furthermore, a circlip 54 at the upper end of the rod 48 is now in contact with the disc 47. Therefore, when the rocker end 22 is caused by a curb to swing in the clockwise direction (as viewed in FIG. 5) the spring 40 is compressed by the downward movement of the crank arm 51 and the rod 48 with the circlip 54 thrusting the abutment member consisting of the disc 47 downwards away from the abutment member consisting of the clrclip 53. This compression continues until the rocker end 22 is clear of the curb. Whereupon the spring returns the mechanism to the condition of FIG. 5.

When it is desired to put the rocker end 22 into the inoperative position, the strut 21 is swung so that the crank arm passes over the aforesaid dead-centre position so that the crank arm 51 snaps over to the opposite side of the axis of the tube 26 with the cylinder 46 and rod 48 occupying approximately a mirror image position with respect to that shown in FIG. 5 and the rocker end 22 being correspondingly lifted.

Figure 8:
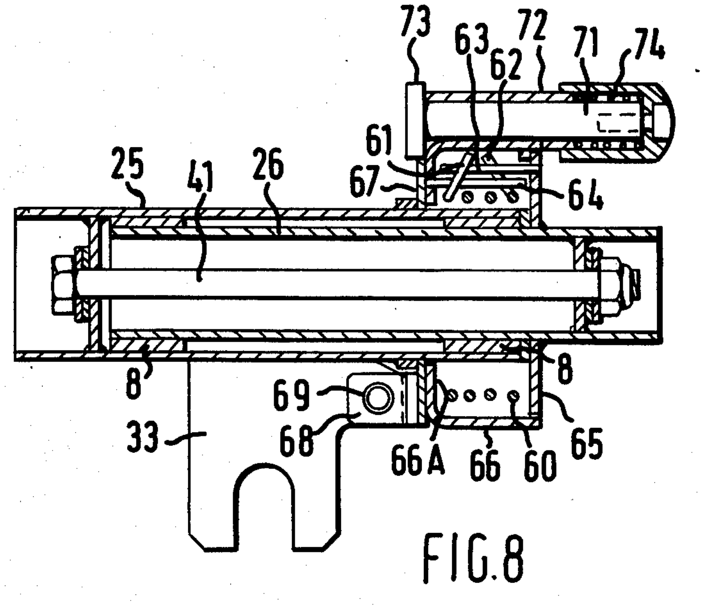
FIG. 8 is a sectional plan of a modified form of spring mechanism, the section being on line VIII—VIII in FIG. 9.

Referring now to FIGS. 8 to 10, it will be seen that an assembly 25, 26, 41 is again employed, but it will be seen that the spring mechanism now comprises a helical torsion spring 60 surrounding the sleeve 25. The main strut 21 is again fixed to the tube 26. The torsion spring 60 is prestressed and during the idle condition of the mechanism, the ends 61, 62 of the spring press on opposite edges of projections 63, 64. The projection 63 is fixed to a plate 65 fixed to the tube 26 and the projection 64 is fixed to an inwardly projecting circumferential flange 66A on a cylinder 66 surrounding the spring 60. The cylinder 66 is locked by means described below to an annulus 67 secured to the sleeve 25. To provide precise adjustment of the annulus 67 about the axis of the tube 26, the annulus 67 is provided with opposed brackets 68 carrying set screws 69 that engage opposite faces of a tongue 70 fixed to the sleeve 25.

When the assembly is in the normal, ready position, the spring ends 61, 62 and projections 63, 64 are in the relative positions shown diagrammatically at A in FIG. 10. However, when the rocker end 22 encounters an obstacle so that it is turned about the axis of the tube 26, the plate 65 and projection 63 are rotated towards one of the positions as indicated at B and C in FIG. 10, the direction depending on the direction in which the rocker end 22 is moved, either the spring end 61 or 62 being moved. The stress in the spring is, therefore, increased ready to return the parts to position A when allowed to do so.

A reciprocable pin 71 is mounted in a sleeve 72 on the cylinder 66. The pin is provided with a circular head 73 arranged to be held by a compression spring 74 in either one of two notches 75, 76 (FIG. 9) in the annulus 67. In one of the two positions determined by these notches, the assembly operates as described above. In the other one of the two positions, the rocker end and main strut are set in the inactive position. This is due to the sub-assembly consisting of the strut 21 (not shown in FIGS. 8 to 10), the tube 26, the plate 65, the cylinder 66 and the entire spring 60 (without altering the stress therein) being shifted through a substantial angle about the tube axis.

I claim:

1. An attachment for a vehicle, such as a wheelchair, having relatively small wheels to enable such wheels to negotiate obstructions within a predetermined range of heights, such as the curbs of side-walks, the attachment comprising a member for rigid attachment to the vehicle adjacent a wheel, a strut pivoted to said attachment member about an axis, the attachment member being formed for the axis to lie in a horizontal plane above the wheel and perpendicular to the direction of travel of the vehicle, an arcuate rocker end, centred on said axis, fixed to the end of said strut remote from said axis, a first abutment member secured to said attachment member, a second abutment member mounted for to-and-fro movement with said strut over at least part of the range of movement of said strut, a spring operative to hold said first and second abutment members in contact with one another when said strut is in a ready position for negotiating an obstruction, said spring being fitted so as to be in a strained condition when said abutment members are in contact, and means interposed between said strut and said spring operative further to strain said spring, when, in the forward movement of the vehicle, said arcuate rocker end engages an obstruction thereby being swung backwards with respect to the vehicle, said strut being of such length that when said rocker end engages an obstruction within said predetermined range of heights, the vehicle is lifted in the zone of the wheel enabling the wheel to pass onto the obstruction and said rocker end to be returned by said spring to the ready position determined by said abutments.

2. An attachment according to claim 1, comprising a cylindrical sleeve centred on said axis, a tube rotatably mounted in said sleeve, said strut being fixed to said tube, said spring being a prestrained torsion spring positioned axially in said tube and connected at its opposite ends to said tube and said sleeve, said abutments being arranged to be separated from one another when said arcuate rocker is swung backwards from the ready position.

3. An attachment according to claim 2, in which said second abutment member is a link pivoted to said strut, and said attachment further comprises resilient means interposed between said link and said strut adapted for said link and said strut to remain fixed with respect to one another while said abutments are separating but to yield, permitting said link and said strut to separate, if said arcuate rocker end is swung forwards from the ready position.

4. An attachment according to claim 1, comprising a crank arm fixed to said strut to rotate therewith about said axis, a cylinder, a rod mounted to reciprocate axially through said cylinder, said spring being a helical compression spring in said cylinder, coaxial with said rod, said second abutment member and a third abutment member respectively mounted on the ends of said spring, said first abutment member and a fourth abutment member respectively mounted at the ends of said cylinder respectively for engagement with said second and third abutment members, connecting means between said crank and said rod whereby said crank can be moved through a dead-centre location wherein said spring is compressed with said third and fourth abutment members separated, to carry said arcuate rocker end from said ready position to an idle position, said first and second, also said third and fourth abutment members, being in contact with one another for each such ready and idle position, and a fifth abutment member secured to said rod and operative to separate said second and first abutment members compressing said spring when said arcuate rocker end is moved backwards from the ready position on encountering an obstacle.

5. An attachment according to claim 1, in which said spring is a helical torsion spring having one end constituting said second abutment member and the other end constituting a third abutment member, the spring being prestrained so that said second and third abutment members engage opposite sides of said first abutment member when said arcuate rocker is in said ready position, the attachment also including a fourth abutment member fixed to said strut and interposed between said second and third abutment members whereby, when said arcuate rocker end is moved forwards or backwards from said ready position, said fourth abutment member engages one or other of said second and third abutment members thereby increasing the strain in said spring, said abutment members, spring and strut being mounted as a sub-assembly rotatable from the position in which said arcuate rocker end is in the ready position to the position in which it is in an idle position, the attachment including also means for locking the sub-assembly in either such position.

6. An attachment according to claim 5, in which said attachment member comprises a cylindrical sleeve coaxial with said axis and the attachment includes a tube rotatably mounted in said sleeve and having said strut fixed thereto, said helical torsion spring being mounted to surround said tube, the attachment further including an annulus surrounding said tube and fixed thereto and formed with peripheral notches corresponding to said ready and idle positions of said arcuate rocker end, and a cylinder surrounding said spring and forming part of said sub-assembly, said locking means comprising a spring-loaded plunger fixed to said cylinder and adapted to engage either one of said notches.

7. A wheelchair having at least one forward wheel and an assembly enabling the wheel to negotiate obstructions within a predetermined range of heights, such as the curbs of side walks, said assembly comprising a member attached to said wheelchair adjacent said wheel, a strut pivoted to said attached member about an axis in a horizontal plane above said wheel and perpendicular to the direction of travel of the wheelchair, an arcuate rocker end, centred on said axis, fixed to the end of said strut remote from said axis, a first abutment member in a fixedly retained position on said attached member, a second abutment member mounted for to-and-fro movement with said strut over at least part of the range of movement of said strut, a spring operative to hold said first and second abutment members in contact with one another when said strut is in a ready position for negotiating an obstruction, said spring being fitted so as to be in a strained condition when said abutment members are in contact, means interposed between said strut and said spring operative further to strain said spring when, in the forward movement of the wheelchair, said arcuate rocker end engages an obstruction thereby being swung back with respect to the wheelchair, said strut being of such length that when said rocker end engages an obstruction within said range of heights, the wheelchair is lifted in the zone of said wheel enabling said wheel to pass onto the ostruction and said rocker end to return to the ready position determined by said abutments, and means enabling said rocker end to be retained by said spring in an idle position with respect to said attached member.

8. A wheelchair according to claim 7, in which said means enabling said rocker end to be retained in an inoperative position with respect to said attached member comprise a resilient member fixedly retaining said first abutment member on said attached member but permitting said first abutment member to yield in a direction transverse to the point of engagement with said second abutment member when pressed in that direction, said axis being positioned to enable said strut to be swung past said first abutment member when so pressed and then retained in said idle position by said first abutment member when said first abutment member is released to said fixedly retained position on said attached member.

9. A wheelchair according to claim 7, in which said means enabling said rocker end to be retained in an idle position with respect to said attached member comprise mechanism inteposed between said strut and said spring whereby said spring can snap over from a position in which said spring holds said rocker end in the ready position and a position in which said spring holds said rocker end in the idle position, with said abutments being in contact in both said positions.

10. A wheelchair according to claim 7, comprising an element mounted for rotation about said axis, means for latching said element in each of two positions about said axis, said strut and said spring being mounted on said element to constitute a sub-assembly therewith such that when latched in one position, said rocker end is in said ready position and, when latched in the other position, said rocker end is latched in the idle position.

* * * * *